Sept. 7, 1965 D. J. GRIFFITHS 3,204,845

TAPE APPARATUS

Filed June 3, 1963 2 Sheets-Sheet 1

INVENTOR.
DEREK J. GRIFFITHS
BY
Christie, Parker & Hale
ATTORNEYS.

Sept. 7, 1965 D. J. GRIFFITHS 3,204,845

TAPE APPARATUS

Filed June 3, 1963 2 Sheets-Sheet 2

INVENTOR.
DEREK J. GRIFFITHS
BY
Christie, Parker & Hale
ATTORNEYS.

United States Patent Office 3,204,845
Patented Sept. 7, 1965

3,204,845
TAPE APPARATUS

Derek J. Griffiths, Arcadia, Calif., assignor to Burroughs Corporation, Detroit, Mich., a corporation of Michigan Filed June 3, 1963, Ser. No. 285,124
6 Claims. (Cl. 226—199)

This invention relates to a tape transport system and, more particularly, to an adjustable tape guiding and positioning device.

A tape transport system generally includes a device for operating upon the tape such as a punch or magnetic writing head or a tape reader such as a bank of photo cells and a light source. The transport system further includes a pair of capstan drive units, one positioned on either side of the operating device for imparting forward and reverse movement to the tape through the operating device. In addition to the capstans and operating device, there is required a means for positioning and guiding the tape through the area of the operating device. Thus, in a tape transport system, means must be provided to position the tape over the reading or writing device for proper operation. Additionally, when various widths of tape are employed, the guiding and positioning means must be adjustable.

Various methods have been employed in the past such as adjustable rotating rollers or fixed pins with an adjustable front hub and movable slide. However, these devices require that the tape be held and controlled by a tape handler such as a reel for effective operation. When the tape is not being held by a tape handler, such as occurs when strip reading is being done, additional guiding must be provided to hold the tape down. The additional guiding as well as the usual guiding devices have, in the past, been quite elaborate. These devices have employed a plurality of rollers for the guiding of the tape. The elaborate system has been required because of the length of the tape path through the reading or writing area and through the buffering system. In addition to this long tape path, there is the erratic and violent action of the buffering system, which combined require that guiding be provided at many points along the path to correctly position the tape in the reading or writing area.

The majority of the information is located on the tape with respect to the back edge of the tape. For example, in a tape punch, acting as a writing head, the information holes are punched across the width of the tape in locations with respect to the rear edge. Most tapes that are presently employed have an information pattern that is constant with respect to the rear edge. However, there are some tapes which do not have an information pattern which is the same as found in other tapes. Or, in other words, no one information pattern is universally employed. For example, in the Teletype art, the sprocket hole in the tape, which is often employed as a parity check, has a dimension of .297" from the back edge. On the other hand, most of the other tapes have a sprocket hole that is .392" from the back edge. These does not appear to be any type transport system presently in use that will accommodate various widths of tape that have information patterns that are different.

An effective way to eliminate the elaborate guiding system employed in the past is to employ a guiding and positioning device near the reading or writing area which has a non-critical entrance angle. In addition, it is desirable that the guiding and positioning device accommodate various widths of tape and various information patterns with respect to the rear edge of the tape. Such a guiding and positioning device comprises a pair of identical rotatable guides with slots cut into the guides to accommodate the various widths of tape. The guides are positioned on each side of the selected area which, in general, includes a reading or writing head. The guiding and positioning device further includes a means located adjacent to the rotatable guides for tensioning the tape in the selected area and keeping the tape on the guides.

The guides have selected slots cut into them to accommodate various widths of tape. Some of the slots have a back edge that lie in a common plane to accommodate tapes having one information pattern. The remaining slots have a back edge that lie in a plane that is a preselected distance from the common plane to accommodate tapes that have a different information pattern. The two guides are advantageously geared together through an indexed idler gear which is connected to a marked control knob through a flexible coupling so that a single control is employed to select the desired slot on the guides.

These and other features and advantages of the present invention will be understood more clearly and fully upon consideration of the following specification and drawing, in which.

Figure 1:
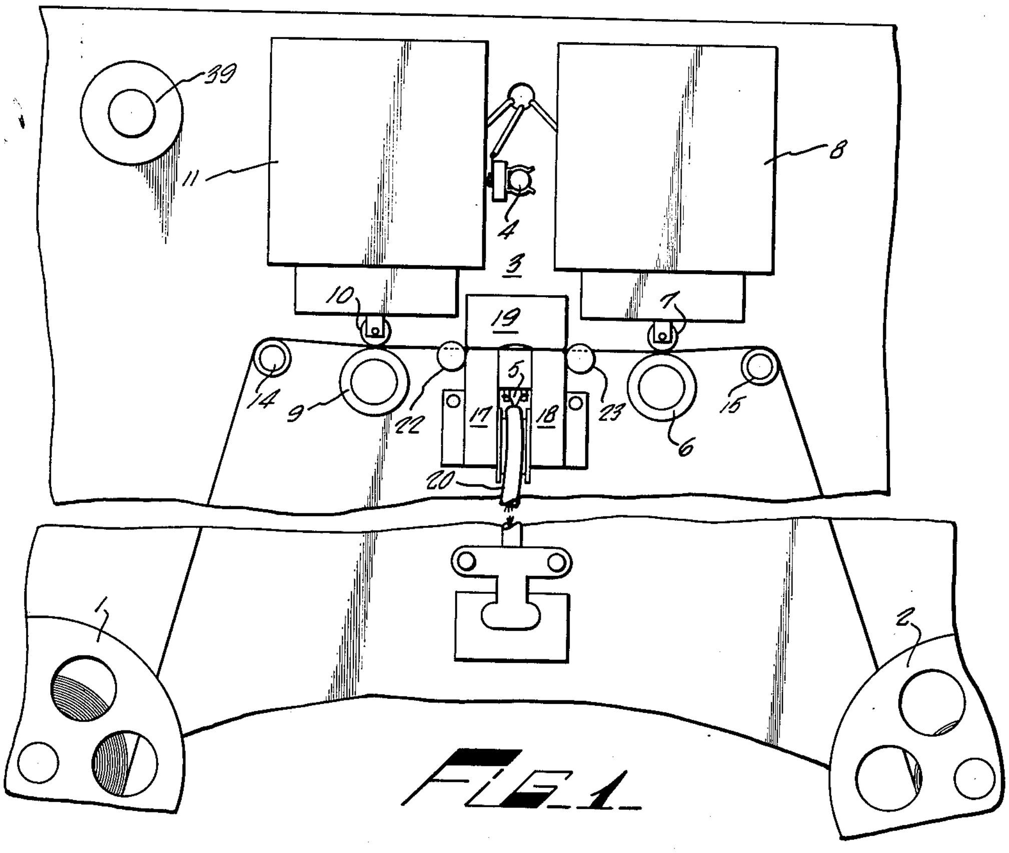
FIG. 1 shows a guiding and positioning device of a tape transport system in accordance with the present invention.

Now referring to the drawings, in FIG. 1 there is shown a tape transport system which includes the guiding and positioning device in accordance with the invention. The tape transport system comprises a pair of reels 1 and 2 for storing the tape. The tape is wound from reel 1 through the area in which it is operated upon and rewound on reel 2 in the forward direction of movement. The embodiment shown in FIG. 1 includes a reading head 3 which consists of a light source 4 and a plurality of photo electric cells 5, of which only one is shown. It is noted that the invention may also be advantageously employed in a tape transport system including a writing head. However, the reading head is shown for illustrative purposes.

The tape is pulled in the forward direction by the action of a capstan 6 and a pinch roller 7. The pinch roller 7 is activated through a control box 8. The reverse movement of the tape is similarly controlled by a capstan 9 and pinch roller 10, with the pinch roller 10 being controlled by a control box 11. The tape is looped around the idler rollers 14 and 15 to permit the unwinding and winding on reels 1 and 2.

The tape path will also advantageously include a buffering system which is not shown to prevent the breaking of the tape during stopping and starting of the movement of the tape. It is noted that the guiding and positioning device may also be employed in a system that does not use reels for the storage of the tape. That is, it is also useful for strip reading and fanfold storage as distinguished from reel storage.

As the tape passes over the reading head 3, the information pattern is detected and the information is read out. In order to tension the tape over the reading head to prevent flutter and jumping of the tape, i.e., lateral and vertical movement, the tape is passed over laterally spaced supporting elements 17 and 18 and positioned thereagainst by a clapper 19.

The clapper may advantageously be spring loaded so that the proper amount of pressure is applied to the top surface of the tape as it moves longitudinally through the reading area. Additionally, the clapper 19 may be composed of a magnetic material with the supporting elements 17 and 18 forming the poles of a horseshoe magnet. Thereafter, a coil 20 may be wound around a bar which joins elements 17 and 18 to form an electromagnet. Thus, the clapper 19 may also serve as a brake by the application of current to coil 20 to pull clapper 19 down against the supporting elements 17 and 18. When the clapper is not also employed as a brake, the clapper and supporting elements may advantageously be composed of non-magnetic material.

As is well known in the art, in order to either write information on the tape by magnetic means or punchced hole means or read information from the tape, the tape must be precisely positioned while in the selected area which includes the reading or writing device. Therefore, it is necessary to have some means of positioning and guiding the tape through the area of interest. The positioning and guiding device of the tape transport system of FIG. 1 includes two identical rotatable guides 22 and 23, which act in conjunction with clapper 19. A top view of the guiding and positioning device is shown in detail in FIG. 2.

Figure 2:
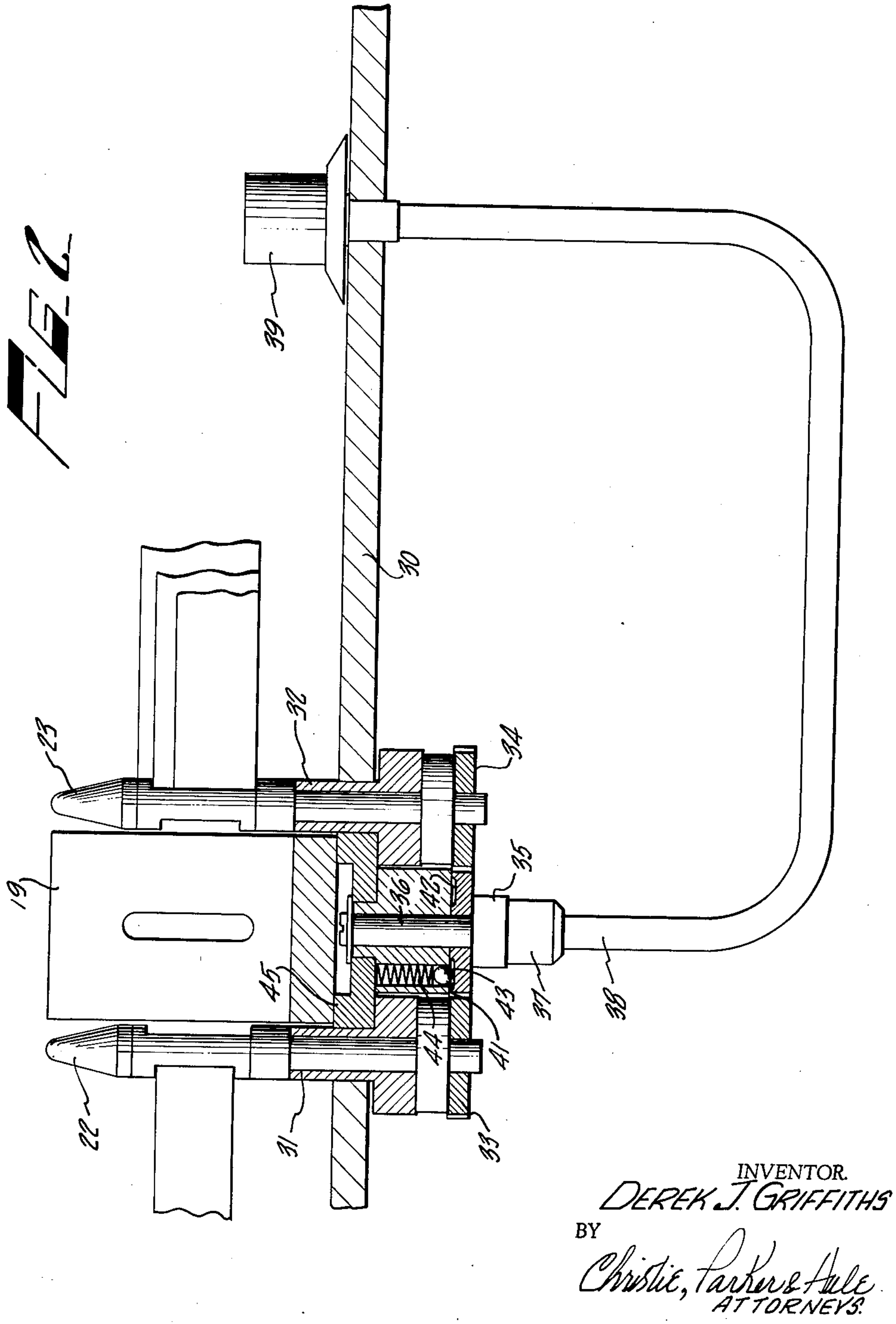
FIG. 2 shows an elevation view of the guiding and positioning device in accordance with the invention.

Now referring to FIG. 2, it is seen that the two identical rotatable guides 22 and 23 are positioned on opposite sides of clapper 19. The guides 22 and 23 extend through the front panel 30 of the tape transport system. Guide 22 is positioned in a bushing 31 and guide 23 is positioned in a bushing 32. The portion of the guide that extends through bushings 31 and 32, respectively are cylindrical. Guide 22 has a toothed gear 33 attached to the end that is behind the panel 30. Guide 23 similarly has a tooth gear 34 attached to it. Between the gears 33 and 34 is positioned an indexing idler gear 35 which contacts both gears 33 and 34. Idler gear 35 is positioned to be rotatable on a cylindrical rod 36. Connected to one end of the rod 36 is a coupler 37. Also connected to coupler 37 is a flexible drive 38 which extends to a control knob 39, which is located on the front of the panel 30. Thus, the rotatable guides may be easily rotated by turning the control knob 39 through the action of gears 33, 34, and 35. The guides 22 and 23 have slots cut therein to accommodate various widths of tape.

It is to be noted that the positioning and guiding device is applicable for the transporting of tape having information stored either magnetically or by punched holes.

It is well known in the art, the information is generally positioned on the tape with respect to the back edge of the tape. In FIG. 2 there are shown four different tapes that have different widths. Three tapes are shown on the right-hand side of the positioning and guiding device. These three tapes have a common plane against which their back edge is positioned. These tapes are representative of a type that have a common information pattern with respect to the back edge. A fourth tape is shown on the left-hand side of the device in FIG. 2 and is representative of the type of tape that has an information pattern different from that used on the tapes shown on the right-hand side. To properly operate upon the left-hand tape, it is necessary to move its back edge forward so that it is no longer against the common plane of the other tapes. This left-hand tape may be typically a 11/16" Teletype tape which has sprocket holes that are .297" from the rear edge of the tape. The tapes on the right-hand side all have a sprocket hole which is a .392" from the rear edge and employ identical information patterns.

Figure 3:
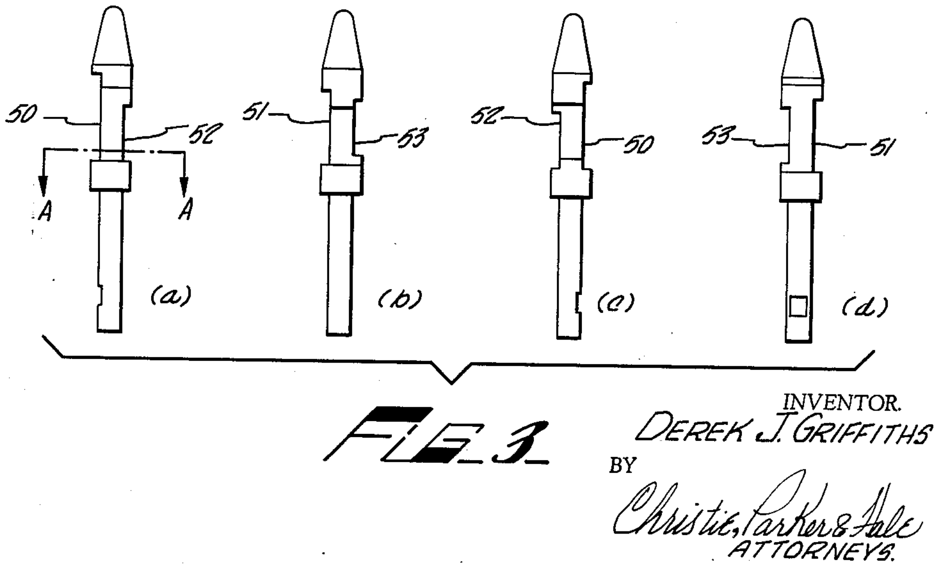
FIG. 3 shows the adjustable guides of FIG. 2 in detail.

A preferred embodiment of the identical adjustable guides 22 and 23 is shown in FIG. 3. Only one of the guides is shown in FIG. 3 since they are identical. There are slots cut into the guide on four sides so that a cross section through section AA would be a square. Each view of the guide in FIG. 3 represents a rotation of 90° with respect to the adjacent view. Thus, FIG. 3A shows the longest slot 50 on the top with the shortest slot 52 on the bottom. Therefore, when the guide is inserted in the bushing on the face of the tape transport system, it will accommodate a tape having the width of the slot. It is noted in FIGS. 3A, 3B and 3C that the back edge of each slot lies in a common plane. However, the top slot 53 in FIG. 3D is a preselected distance from this common plane. This slot will accommodate the tape that is shown on the left-hand side of FIG. 2 and which may be the common 11/16" Teletype tape.

The preferred embodiment shown in FIG. 2 provides guiding and positioning of the tape where it is most needed, i.e., in the area in which the tape is operated upon. If this area includes a reading head as shown in FIG. 1, then the tape is held down by the action of clapper 19 which strengthens the tape to enable it to be precisely positioned and guided by the guides 22 and 23. Thus, flutter and jumping are eliminated and the angle of entrance is not critical because it is compensated for the guides 22 and 23. Since the entrance angle is not critical through the action of the positioning and guiding device of the present invention, the requirement for other guides in the tape path is eliminated, thus doing away with the prior art elaborate guiding mechanism. Additionally, the action of the clapper 19 in holding down the tape creates an effective wiping action so that self-cleaning is obtained.

The guides 22 and 23 as seen in FIG. 2 have tapered ends so that the tape may be readily inserted under the clapper and into the area of interest. For some applications, it may be required that the clapper be positioned outside the center area on the opposite sides of guides 22 and 23. This may be necessary in the tape punch device. For such an application, the supporting elements 17 and 18 would also be moved to the other side of the guides 22 and 23, respectively, and the clapper 19 would be broken up into two pieces and positioned immediately above elements 17 and 18.

When the four slotted guides of FIG. 3 are employed in the positioning and guiding device, the idler gear 35 is provided with four notches as depicted by notches 41 and 42 in FIG. 2. The notches are spaced 90° apart in correspondence to the position of the slots on the guides 22 and 23. A ball bearing or steel ball 43 is positioned on the left-hand side of rod 36 to fit into the slots as they are rotated into the position shown for slot 41. Ball 43 is held into position by a spring 44 which is mounted on a support 45. Thereafter, it is a simple matter to turn the knob 39 to the next indexed position and have an accurate positioning of the guides 22 and 23 through the action of gears 33, 34, and 35, and the slots and ball 43. Since the guides are thus rotated together, the possibility of incorrect setting for the tape to be transported is eliminated. Additionally, the control knob 39 may be marked so that the position of the guides 22 and 23 can be easily seen on the control knob.

What is claimed is:

1. In a tape transport system, means for positioning the tape in a selected transducing area comprising first means immediately adjacent to a first side of the selected area for guiding the tape through the selected area, second means immediately adjacent the side opposite the first side for guiding the tape through the selected area, each of said guiding means include a cylindrical rod having a plurality of tape slots designed therein, each slot having a selected dimension equal to the width of a tape to be transported and means adjacent to each guiding means for restraining the tape movement through the selected area and for keeping the tape on the guiding means.

2. Positioning means in accordance to claim 1 wherein the slots in the cylindrical rod are four in number and create a square cross section in the rod in the area of the slots.

3. Positioning means in accordance with claim 1 wherein some of the slots are cut with their back edge lying in a common plane while the remainder of the slots are cut so that the back edge lies in front of the common plane by a preselected amount.

4. In a tape transport system having a mounting panel, means for positioning the tape in a selected area on the front of the mounting panel, a first aperture in the mounting panel positioned on one side of the selected area, a second aperture in the mounting panel located on the opposite side of the selected area, bushing means positioned in each aperture, guiding rods passing through the bushing means, each rod terminating on the backside of the mounting panel in a toothed gear, an indexing gear positioned between the toothed gears of the rods and in contact with both gears, a control knob mounted on the face of the mounting panel, flexible drive means connected between the control knob and the indexing gear, indexing notches located in the face of the indexing gear at selected points, and means adjacent each guiding rod on the face of the mounting panel for strengthening the tape in the selected area and for keeping the tape on the guiding rods.

5. Positioning means in accordance with claim 4 wherein the guiding rods terminate on the end opposite the toothed gears in a point.

6. In a tape transport system, means for positioning the tape in a selected transducing area comprising a pair of identical rotatable guides, slots cut into the guides to accommodate various widths of tape, means for positioning the guides on each side of the selected area wherein the positioning means includes means for gearing together the guides through an indexing idler gear, means for rotating the idler gear through selected positions to simultaneously turn the pair of guides to the desired position, and means adjacent to each guide for restraining the tape movement through the selected area and keeping the tape on the guides.

References Cited by the Examiner

UNITED STATES PATENTS

| | | | |
|---|---|---|---|
| 2,044,707 | 6/36 | Lasker | 234—1 |
| 2,515,012 | 7/50 | Kreider | 234—1 |
| 2,988,294 | 6/61 | Neff | 226—199 X |
| 3,091,794 | 6/63 | Pillsbury | 226—97 X |
| 3,092,295 | 6/63 | Giannuzzi | 226—49 |
| 3,097,777 | 7/63 | Floyd | 226—39 |
| 3,100,591 | 8/63 | Trimble | 226—39 |
| 3,123,272 | 3/64 | Pollaschek | 226—199 X |

ROBERT B. REEVES, *Acting Primary Examiner.*

RAPHAEL M. LUPO, *Examiner.*